Patented June 20, 1950

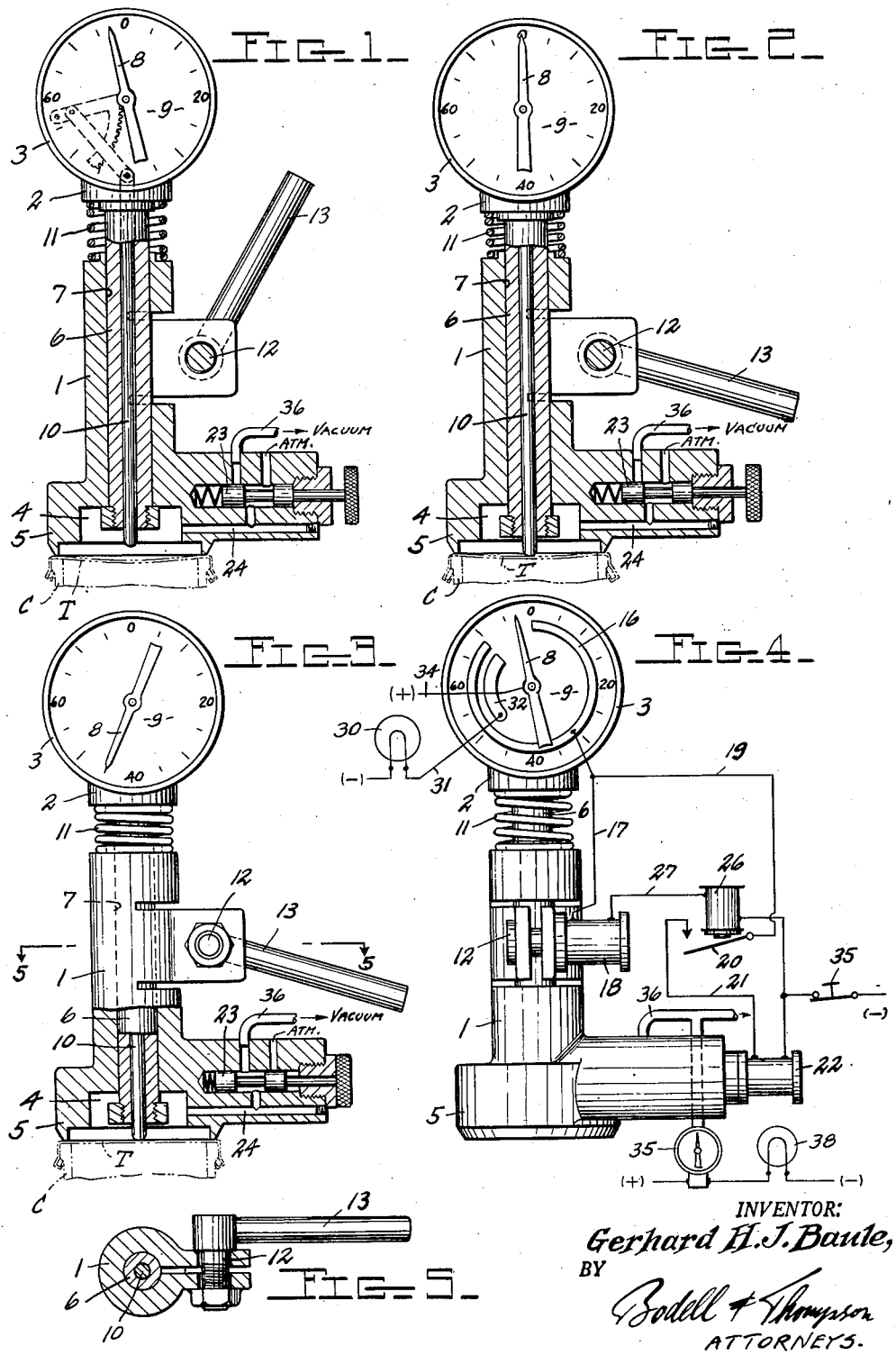

2,512,134

UNITED STATES PATENT OFFICE 2,512,134

VACUUM TESTING INSTRUMENT

Gerhard H. J. Baule, Syracuse, N. Y.

Application October 8, 1947, Serial No. 778,538

5 Claims. (Cl. 73—37)

This invention has for its object an instrument for testing the amount of vacuum in containers of vacuum packed foods and the like, or for comparing the vacuum in the container with a predetermined vacuum of known value.

Food, and other products, are sometimes packed under vacuum and, in order that the contents may stay preserved for a maximum length of time, the vacuum in the container must be of a predetermined minimum, say thirty-three percent of a complete vacuum.

This instrument is for the purpose of quickly measuring or testing containers to determine whether or not the vacuum therein is a predetermined minimum. Heretofore, the testing of containers for the vacuum has been uncertain or haphazard. The covers of the sealed tops are usually of metal and sealed at their peripheries to the containers and the vacuum measured or compared by the deflection of the sealed top, or the diaphragm-like portion covering the open top of the container, but this method is unsatisfactory because the original covers, before being applied to the containers, may be deflected, slightly distorted, or dented, thereby making uniform testing impossible.

This instrument operates on a new fundamental principle of comparing the vacuums or absolute pressures on opposite sides of substantially equal areas of a cover with a diaphragm-like portion by indicating the deflection regardless of whether the cover is in exactly its original form, or slightly distorted, warped, or dented. The comparison is made by means of a measuring instrument including fixed and movable elements, the fixed element being in this embodiment of the invention a dial, and the movable element a pointer also serving primarily as a switch arm.

The invention consists in the novel features and in the combinations and constructions hereinafter set forth and claimed.

In describing this invention, reference is had to the accompanying drawings in which like characters designate corresponding parts in all the views.

Figures 1 and 2 are sectional views, partly in elevation, of this instrument, the pointer of the dial being shown as short of zero position in Figure 1, and as having been moved into zero position by the container top in Figure 2, and the lock being shown in Figure 1 as in unlocked position, and in Figure 2 in locked or operated position.

Figure 3 is a view, similar to Figure 2, showing the operation of the pointer over the dial by the deflection of the container top under the vacuum in the vacuum chamber.

Figure 4 is an elevation of this instrument showing diagrammatically electrical means for operating the lock when the pointer reaches zero position, and for also automatically opening a vacuum valve in the vacuum system for the vacuum chamber.

Figure 5 is a sectional view on line 5—5, Figure 3.

The instrument includes generally a main body member formed with a vacuum chamber, in which a vacuum of known value is created, opening through one face of the body member and so located that the diaphragm like portion of the container top constitutes one wall of the chamber when the container top is seated against said face, a second body member, a measuring or comparing instrument carried thereby and including relatively fixed and movable elements, the latter being normally short of starting position to which it shifts preliminary to starting to measure, an actuator for the movable element extending through the vacuum chamber into position to contact the container top when being placed against the face of the main body, and actuated thereby to shift the movable measuring element to starting position, the main body and the second body having relative shifting movement when the container top is initially shifting the actuator, and lock mechanism operable to lock the main body and the second body from relative movement when the movable element is shifted to starting position by the actuator during said relative movement. The operating means for the lock mechanism is controlled by the shifting of the movable measuring element to starting position.

In the specific embodiment of the invention, the fixed and movable elements of the measuring or comparing instrument are a dial and a pointer.

The numeral 1 designates the main body member, 2 the second body or dial carrying member, and 3 the indicator carried as a unit therewith. The main body member is formed with a head provided with a vacuum chamber 4 opening through the outer face of the head. The chamber is provided with an annular wall 5 for snugly engaging the container top T at the rim thereof to form an air tight seal between the wall 5 and the rim of the top T of the container C so that the container top, or the diaphragm portion thereof, forms one wall of the vacuum chamber 4.

In order to provide the relative movement of the main body member and the second body or indicator carrying member, the indicator carrying member is shown as provided with a stem 6 slidably mounted in a bore 7 in the body member 1 and opening through the top of the vacuum chamber 4, and the movable element or pointer 8 is shifted over the face of the dial 9 by an actuator 10 extending axially of the indicator carrying member 2 and slidable in a bore in the stem 6 and projecting transversely or axially into the vacuum chamber 4 in position to contact the top of the container when the top is seated against the edge of the wall 5 of the vacuum chamber. Upon relative movement of the second body or indicator carrying member 2 and the main body downwardly, as against the action of a returning spring 11, from the position shown in Figure 1 to that shown in Figure 2, the actuator, upon contacting the container top, is shifted by the container top upward and actuates the pointer toward and into starting position. At this point, the locking means is operated to lock the main body member 1 and the second body or indicator carrying member 2 from relative movement, and also a predetermined vacuum is made effective in the chamber 4 so that the container top is deflected by the predetermined vacuum in the chamber 4, thus additionally shifting the actuator 10 and hence, the pointer from starting position over the face of the dial until a balance is reached between the vacuum in the chamber 4 and the vacuum in the container.

The indications on the dial, as shown on the drawing, indicate the amount of deflection of the container top under the differential action at the predetermined vacuum and the vacuum in the container. If the indication, or deflection, is up to or above a predetermined amount, the vacuum in the container is insufficient and the container is rejected. If the indication or deflection is not up to that predetermined amount, the vacuum in the container is sufficient and the container satisfactory for sale.

In the illustrated embodiment, the lock consists of a clamp, Figure 5, formed by making a portion of the body member 1 in the form of a split ring, and the split ring is clamped onto the stem of the indicator in any suitable manner being shown for illustrative purposes by a clamping screw 12 operable as by a lever 13 to clamp opposite portions of the split ring toward each other. Preferably, the clamp is operated automatically when the pointer 8 reaches zero position and, as here illustrated, the pointer makes contact with an arcuate contact 16 in an electric circuit when the pointer reaches zero position and completes a circuit through wire 17 to an electromagnetic device or solenoid 18 connected to the clamping screw or member 12 to operate it when the circuit is closed.

Also, as shown in Figure 4, a valve in a vacuum circuit is automatically operated from closed position to open position through a circuit closed when the pointer 8 engages the contact 16, through a line including the wire 17, a wire 19, a normally open switch 20, wire 21, to a solenoid 22, which opens the valve 23 in a duct 24 leading from the chamber 4 to a vacuum pump, or other source of vacuum. The switch 20, which is normally open, is closed by an electromagnet or retarded solenoid 26 connected in circuit with the windings of the solenoid 18, through wire 27, so that when the solenoid 18 is energized by the movement of the pointer to zero position, also the magnet 26 is energized to close the switch 20.

All circuits are completed through a normally closed switch 35 which is opened after each testing operation to release the container. The switch may be operated by hand, or automatically.

The instrument, as here shown, is constructed to be placed on the heads of the containers, that is, portable and carried in the hand and may, of course, be associated with mechanism wherein the instrument is stationary and the containers brought in contact with the body member automatically, or by a carrier. This instrument is particularly advantageous in that there is no comparison of the vacuum until the movable measuring element or pointer has been first shifted to starting or zero position by the relative movement of the main body member 1 and the second body or indicator carrying member 2.

When the vacuum in the container is below a predetermined minimum, as thirty-three percent, this is indicated by a signal 30 in circuit, through wire 31, with a contact 32 arranged in the path of the pointer to be engaged thereby when moved beyond a predetermined maximum point around the dial. The pointer acts as a switch arm and is connected to the positive side of a feed circuit through wire 34. This signal means is illustrative of something controlled by the indicator when the vacuum is less than a predetermined minimum as, for instance, a rejector mechanism of a system where the containers are fed progressively to the instrument, as on a conveyor, and the containers below a predetermined minimum vacuum automatically ejected from the conveyor after failing to pass the test.

Also is shown a gage 35 connected in the vacuum supply pipe 36 for indicating that the vacuum in the pipe 36 connected to the chamber 4 is maintained at a predetermined vacuum. The indicator of the gage may be a switch arm to close a circuit only when the vacuum is maintained at the predetermined known value. In the circuit is a signal 38 which shows only when the vacuum is at the known required value. This signal is illustrative of a control mechanism having a device for stopping the feeding of a conveyor carrying the containers to the comparing and testing instrument.

What I claim is:

1. In an instrument for testing vacuum packed containers having sealed tops with normally inflexible, diaphragm-like portions, a body member formed with a vacuum chamber, in which a vacuum of known value is formed, opening through one face of the body member in such position that the diaphragm portion of the top constitutes one wall of the vacuum chamber when the top is sealed against said face, a second body member, a measuring instrument carried thereby and including fixed and movable elements, the latter being normally short of the start of the measuring operation, said members being mounted to have relative shifting movement in a direction at an angle to said face, an actuator for the movable element extending through the vacuum chamber in position to engage the top of of the container when being placed against said face to be shifted by the container top and being shiftable relative to the second member various distances toward and into starting position by the placing of the vacuum chamber on the container tops before the vacuum is applied, a valve for controlling the application of the vacuum, and lock mechanism operable to lock the said members from relative movement when the movable measuring element is shifted to starting position.

2. In an instrument for testing vacuum packed containers having sealed tops with diaphragm-like portions, a body member formed with a vacuum chamber, in which a vacuum of known value is formed, opening through one face of the body member in such position that the diaphragm portion of the top constitutes one wall of the vacuum chamber when the top is sealed against said face, a second body member, a measuring instrument carried thereby and including fixed and movable elements, the latter being normally short of the start of the measuring operation, said members being mounted to have relative shifting movement in a direction at an angle to said face, an actuator for the movable element extending through the vacuum chamber in position to engage the top of the container when being placed against said face to be shifted by the container top, lock mechanism operable to lock the said members from relative movement when the movable measuring element is shifted to starting position, and operating means for the lock mechanism controlled by the shifting of the movable measuring element to starting position.

3. In an instrument for testing vacuum packed containers having sealed tops with diaphragm-like portions, a body member formed with a vacuum chamber, in which a vacuum of known value is formed, opening through one face of the body member in such position that the diaphragm portion of the top constitutes one wall of the vacuum chamber when the top is sealed against said face, a second body member, a measuring instrument carried thereby and including fixed and movable elements, the latter being normally short of the start of the measuring operation, said members being mounted to have relative shifting movement in a direction at an angle to said face, an actuator for the movable element extending through the vacuum chamber in position to engage the top of the container when being placed against said face to be shifted by the container top, lock mechanism operable to lock the said members from relative movement when the movable measuring element is shifted to starting position, and operating means for the lock mechanism controlled by the shifting of the movable measuring element to starting position, the shiftable measuring element being a switch arm in an electric circuit, and the lock operating mechanism including an electro-responsive motor in said circuit including a contact located to be engaged by the switch to close the circuit when the switch arm reaches starting position and hold the circuit closed during the movement of the arm along the contact.

4. In an instrument for testing vacuum packed containers having sealed tops with diaphragm-like portions, a body member formed with a vacuum chamber, in which a vacuum of known value is formed, opening through one face of the body member in such position that the diaphragm portion of the top constitutes one wall of the vacuum chamber when the top is sealed against said face, a second body member, a measuring instrument carried thereby and including fixed and movable elements, the latter being normally short of the start of the measuring operation, said members being mounted to have relative shifting movement in a direction at an angle to said face, an actuator for the movable element extending through the vacuum chamber in position to engage the top of the container when being placed against said face to be shifted by the container top, lock mechanism operable to lock the said members from relative movement when the movable measuring element is shifted to starting position, and operating means for the lock mechanism controlled by the shifting of the movable measuring element to starting position, the shiftable measuring element being a switch arm in an electric circuit, and the lock operating mechanism including an electro-responsive motor in said circuit including a contact located to be engaged by the switch to close and hold closed the circuit when the switch arm reaches starting position, the vacuum chamber being in a vacuum system having a normally closed, self-closing valve therein, a second circuit having an electro-responsive motor therein operating the valve, a normally open switch in the second circuit and an electro-responsive device in the operating circuit for the lock operating mechanism for closing the last switch.

5. In an instrument for testing vacuum packed containers having sealed tops with diaphragm-like portions, a body member formed with a vacuum chamber, in which a vacuum of known value is formed, opening through one face of the body member in such position that the diaphragm portion of the top constitutes one wall of the vacuum chamber when the top is sealed against said face, a second body member, a measuring instrument carried thereby and including fixed and movable elements, the latter being normally short of the start of the measuring operation, said members being mounted to have relative shifting movement in a direction at an angle to said face, an actuator for the movable element extending through the vacuum chamber in position to engage the top of the container when being placed against said face to be shifted by the container top, lock mechanism operable to lock the said members from relative movement when the movable measuring element is shifted to starting position, and operating means for the lock mechanism controlled by the shifting of the movable measuring element to starting position, the shiftable measuring element being a switch arm in an electric circuit, and the lock operating mechanism including an electro-responsive motor in said circuit including a contact located to be engaged by the switch to close and hold closed the circuit when the switch arm reaches starting position, the vacuum chamber being in a vacuum system having a normally closed, self-closing valve therein, a second circuit having an electro-responsive motor therein operating the valve, a normally open switch in the second circuit and an electro-responsive device for closing the last switch in the operating circuit for the lock operating mechanism, and a signal circuit including a contact in the path of the movable measuring element switch arm and located to be engaged thereby when the switch arm moves beyond a predetermined point on the contact.

GERHARD H. J. BAULE.

REFERENCES CITED

The following references are of record in the file of this patent:

UNITED STATES PATENTS

| Number | Name | Date |
|---|---|---|
| 1,854,346 | Ostlind | Apr. 19, 1932 |
| 2,199,010 | Robb | Apr. 30, 1940 |
| 2,399,391 | Russell | Apr. 30, 1946 |
| 2,453,338 | Pajak | Nov. 9, 1948 |

FOREIGN PATENTS

| Number | Country | Date |
|---|---|---|
| 445,761 | Great Britain | Apr. 17, 1936 |